United States Patent [19]
La Russa

[11] 4,093,347
[45] June 6, 1978

[54] OPTICAL SIMULATION APPARATUS USING CONTROLLABLE REAL-LIFE ELEMENT

[75] Inventor: Joseph A. La Russa, Yorktown Heights, N.Y.

[73] Assignee: Farrand Optical Co., Inc., Valhalla, N.Y.

[21] Appl. No.: 685,017

[22] Filed: May 10, 1976

[51] Int. Cl.$^2$ .......................... G02B 27/10; G09B 9/08
[52] U.S. Cl. ....................................... 350/174; 35/12 N
[58] Field of Search ............... 350/174; 356/251, 252; 35/12 G, 12 L, 12 N, 12 W; 340/27 NA

[56] References Cited
U.S. PATENT DOCUMENTS

| | | | |
|---|---|---|---|
| Re. 27,356 | 5/1972 | La Russa | 350/157 |
| 2,111,198 | 3/1938 | Vice | 350/174 |
| 3,443,332 | 5/1969 | Christy | 40/134 |
| 3,493,290 | 2/1970 | Traub | 350/174 |
| 3,505,561 | 4/1970 | Ward et al. | 315/10 |
| 3,551,043 | 12/1970 | Neuberger et al. | 350/174 X |
| 3,711,826 | 1/1973 | La Russa | 350/174 X |
| 3,824,535 | 7/1974 | Rover | 350/174 X |
| 3,848,974 | 11/1974 | Hosking et al. | 350/174 |

OTHER PUBLICATIONS

"Visual Spaceflight Simulators" Article in *Optical Spectra*, Sep./Oct. 1969, pp. 58–63.

*Primary Examiner*—Jon W. Henry
*Attorney, Agent, or Firm*—John L. Downing

[57] ABSTRACT

Optical simulation apparatus in which three relatively movable images are input to the system. One of the images is produced by a physical display object and the other images are presented on display screens, superimposed by a beam-splitting mirror, and directed to an infinity display system. True apparent distances and relative parallax of the three images are simulated. The simulation is enhanced by tilting elements of the infinity display system and one of the display screens relative to the optical axis of the apparatus.

6 Claims, 6 Drawing Figures

OPTICAL SIMULATION APPARATUS USING CONTROLLABLE REAL-LIFE ELEMENT

BACKGROUND OF THE INVENTION

1. Field of the Invention

The present invention relates to optical simulation apparatus, and more particularly to an optical simulation apparatus having three relatively movable optical image inputs.

2. Description of the Prior Art

In the field of optical simulation, it is often desirable to provide to an observer images projected at true apparent distances. Display systems which project images to infinity are known in the art; one such system is described in U.S. Pat. No. Re.27,356 and manufactured by Farrand Optical Co., Inc., as an in-line infinity display system. When a virtual image (or a plurality of superimposed images) is presented to one side of the infinity display at a distance equal to the local distance of the infinity display the image presented to an observer on the other side appears to be at or near infinity. However, if a virtual image is presented to such an infinity display system at a distance less than the focal length of the system, the observer will perceive that image to be closer than at infinity. This effect is in accordance with the mathematical relationship $$a = (f^2/b) - f,$$

where $a$ equals the apparent distance from the infinity display system of the presented image as seen by the observer;

$b$ equals the separation of the presented image from the focal plane of the infinity display; and $f$ equals the focal length of the infinity display system.

With such an arrangement it is possible to superimpose (by means of a beam splitter, for example) a background image and a foreground image and to present these superimposed images to the infinity display system. By moving the foreground image toward the display system so that it is presented at a distance less than the focal length of the system it appears to an observer to be closer than the background image. Further movement of the foreground image changes the apparent distance of that image.

In other simulation applications, it is desirable to simulate the true relative parallax and apparent distance of a third movable image when viewed in relation to two other relatively movable images. One such application involves the simulation of an inflight air-refueling operation in which a tanker aircraft extends and directs a refueling boom towards an approaching receiver aircraft which is to be refueled. In order to train an operator of the refueling boom to perform the task of directing the boom tip accurately to the receiver aircraft's fueling port on-ground simulation apparatus is desirable so that the operator can become familiar with the dynamic visual cues which are required for the correct performance of the mission.

The present invention in a described embodiment provides simulation apparatus for such an inflight refueling operation in which the trainee observer is not only furnished true stereopsis, but can perceive the true angular sizes of the refueling boom and the receiver aircraft, and also the true relative parallax between the boom and receiver aircraft, and between the receiver aircraft and sky/terrain background.

SUMMARY OF THE INVENTION

The present invention provides an optical simulation apparatus comprising optical means for forming an image at or near infinity (an infinity display). The apparatus also includes first and second display screens with means for generating first and second displays on said screens, respectively; together with optical means for combining images from said first and second display screens and for directing said images toward said optical means for forming an image at or near infinity. A third image is also directed toward the optical infinity display and this third image can be moved relative to the focal plane of said infinity display. In a described embodiment, the third image is produced by means of a movable three dimensional physical object positioned between one of the display screens and the infinity display.

The simulation apparatus of the present invention also provides for the relative movement of at least one of the two display screens relative to the focal plane of the infinity display and for the inclination one or more elements of that infinity display relative to the optical axis of at least one of the two display screens in order to more closely simulate the true apparent distance and relative parallax to an observer of the three images input to the apparatus.

DETAILED DESCRIPTION

Figure 1:
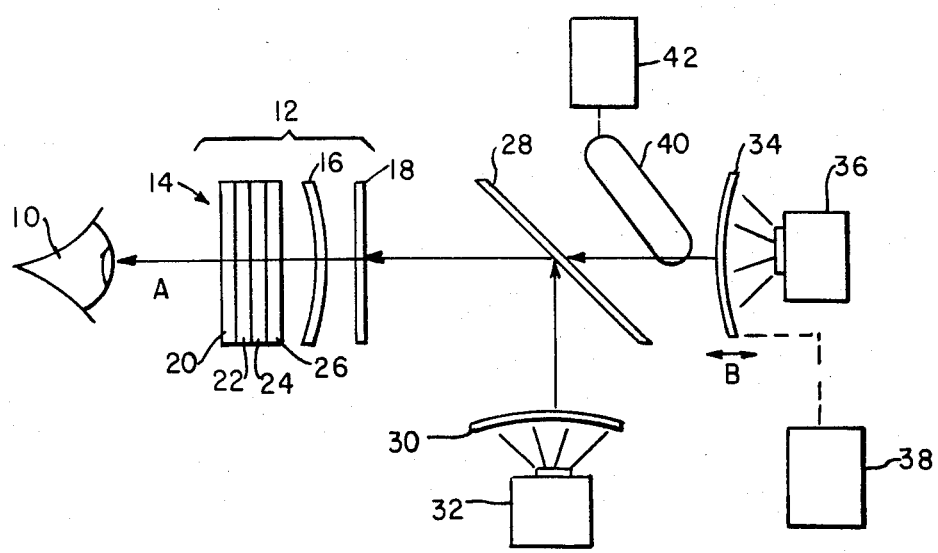
FIG. 1 is a schematic diagram illustrating the arrangement of the optical elements of the present invention.

The general arrangement of the optical elements of the present invention is shown in FIG. 1. An observer 10 to whom the simulation is to be displayed is positioned on one side of an infinity display 12. As described in the previously mentioned U.S. Pat. No. Re.27,356, when images are presented outside the focal plane of the infinity display 12 they appear to the observer 10 to be at or near infinity; when these images are introduced at some distance inside the focal plane of the display system 12, the observer views them as being apparently correspondingly closer to him. The aforementioned reissue patent also describes in detail the composition of an infinity display system 12 which includes a polarizing birefringent element assembly 14, a beam-splitting curved mirror 16 and a first plane polarizer 18. The polarizing birefringent assembly 14 comprises four flat optical elements: a second plane polarizer 20, a first quarter wavelength plate 22, a partially reflecting mirror 24 and a second quarter wavelength plate 26. The fast axes of the two quarter wavelength plates 22, 26 are oriented with respect to each other at 90°, and the plane of polarization 20 is oriented at an odd integer multiple 45° to the fast axis of the second quarter wavelength plate 26, and at 90° to the plane of polarization of polarizer 18.

The partially transmitting, partially reflecting curved mirror 16 is positioned between the bi-refringent assembly 14 and the first polarizer 18 with its concave side facing the bi-refringent assembly 14 and the observer 10.

The infinity display system 12 described above has a focal distance determined by the curvature of the curved mirror 16. When an image is presented to the display system 12 on the side remote from the observer 10 at a distance greater than or equal to that focal distance the image appears to the observer 10 to be at or near infinity. The manner in which these optical elements produce this result is fully described in the previously cited U.S. reissue patent. Also, as noted above, if an image is presented to the infinity display system 12 at a distance less than the focal distance it will appear to the observer 10 to be at some distance closer than infinity.

FIG. 1 also shows a partially reflecting, partially transmitting plane beam-splitting mirror 28 positioned on the optical axis A of the infinity display 12 at a 45° angle thereto. A first display screen 30 is arranged at right angles to the optical axis A so that an image presented on the first display screen 30 is reflected by the mirror 28 toward the infinity display system 12. The first display screen 30 is positioned so that the optical path of an image on that screen reflected onto the infinity display 12 is equal to or greater than the focal distance of the display system 12. A television or film projector 32 is provided for generating a static or movable image on the first display screen 30.

A second display screen 34 is positioned on the optical axis A, and together with an associated television or film projector 34 it presents a second image which is transmitted through the beam-splitting mirror 28 toward the infinity display system 12. The second display screen 34 also has associated with it a position control mechanism 38 by means of which the separation between the screen 34 and the infinity display 12 can be changed from a distance equal to the focal distance of the display 12 to a distance less than that focal distance. The movement of the second display screen is indicated by the arrows B.

A third image is presented to the infinity display system 12 in the form of a movable physical object 40 positioned between the second display screen 34 and the beam splitting mirror 28. Another position control mechanism 42 is provided to change the position of the object 40 relative to the infinity display system 12 and the movable second display screen 34.

As a result of the arrangement of the elements shown in FIG. 1 a first, or "background" display can be presented to the infinity display system 12 on the first display screen 30 at a distance equal to the focal distance of the system so that the background appears to the observer 10 to be at infinity. A second or "foreground" image can be displayed on the second display screen 34 at a variable distance so that the foreground image is superimposed upon the background image and appears to the observer 10 to be at some variable distance closer than the background image. A third image generated by the movable physical object 40 is transmitted through the mirror 28 to the display systems 12 and appears to the observer 10 to be between the observer and the foreground image. By means of this arrangement of elements, it is possible to reproduce to an observer the true apparent distances and true subtended angles of movable second and third images superimposed over a first background image appearing at infinity.

Figure 2:
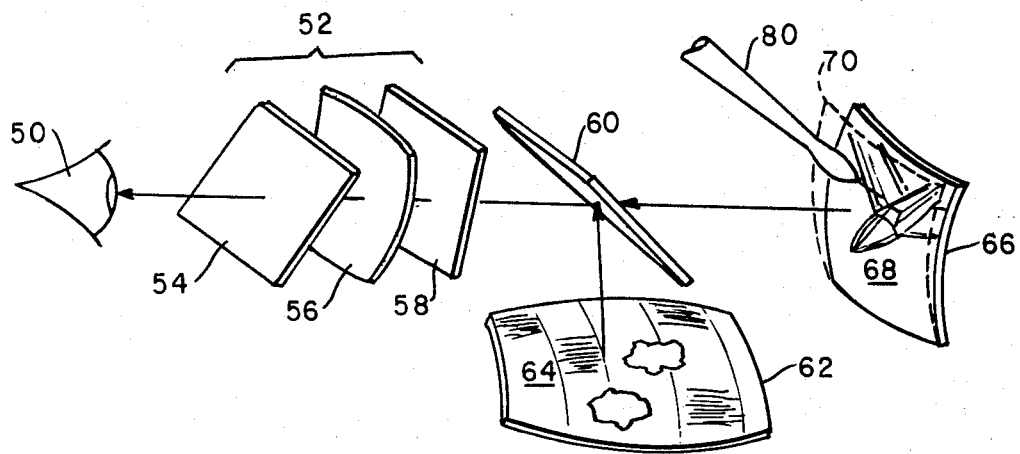
FIG. 2 is a schematic diagram of a specific embodiment of the present invention.

FIG. 2 shows elements of the present invention arranged for a specific simulation, namely, the simulation of an inflight refueling process involving a tanker aircraft, an aircraft to be refueled, and a maneuverable refueling boom to be controlled by a trainee observer.

The trainee observer 50 looks into an infinity display system 52 (such as a Farrand Optical Company In-Line Infinity Image Display System) comprising a bi-refringent assembly 54, curved beam-splitting mirror 56 and plane polarizer 58, as described in connection with FIG. 1, and by means of a plane beam-splitting mirror 60 views the superimposed images presented by a terrain/sky display screen 62 and a receiver aircraft display screen 66. The terrain/sky background image 64 displayed on the screen 62 is produced either by a television projector or by a cine film loop projector (not shown), and the screen 64 is positioned relative to mirror 60 and the infinity display 52 so that the image 64 is on the focal plane of the display 52. The receiver aircraft foreground image 68 on the screen 66 is also produced by a closed circuit television projector (not shown) whose input is a fully gimballed model of the refueling aircraft which is controlled by an external computer or control mechanism. This display screen 66 is also movable by means not shown in FIG. 2 toward and away from the infinity display 52 so that the image 68 can be moved inside the focal plane of the display 52.

A third image is introduced into the simulation system by a scale model 80 of the refueling boom positioned between the mirror 60 and the aircraft display screen 66. The model 80 is movable in pitch and heading under the direction of the observer 50 by means of a position control mechanism (not shown).

Since the terrain/sky image 64 fixed at the focal plane of the infinity display 52, the image 64 is projected to infinity, as viewed by the observer 50. The image 68 of the aircraft to be refueled can be moved in the course of the simulation from the focal plane of the display 52 where it appears to the observer 50 to be at or near infinity to a range of positions inside the focal plane where its apparent distance is correspondingly closer to the observer 50. As the simulated receiver aircraft, viewed against a moving background of terrain and clouds, "approaches" the trainee observer he can control the attitude of the model refueling boom 80, and direct the tip of the boom towards a refueling port indicated on the aircraft image 68. In the overall simulation environment the relative movement of the terrain/sky image, receiver aircraft image can be controlled to simulate realistically the real-life inflight refueling situation, and a monitor of the simulation apparatus is able to evaluate the trainee observer's manipulation of the refueling boom in the simulated refueling operation.

Two additional features of the present invention are illustrated in FIG. 2. First, the birefringent package 54 of the infinity display system 52 is tilted slightly forward relative to the optical axis of the simulation system as shown. When the infinity display 52 is so tilted any high intensity point light sources may be viewed against a dark background without undesirable multiple reflections that might otherwise occur. Any point source that is reflected from the bi-refringent assembly 54 a second time to the curved mirror 56 generates an image which can be seen only by an observer outside the pupil of the display 52.

Second, the aircraft display screen 66 is tilted slightly backward with respect to a plane normal to the optical axis. (The position of the aircraft screen normal to the optical axis is shown in dotted outline 70). As noted above, the aircraft screen 66 is driven longitudinally along the optical axis of the simulation apparatus to make any image thereon appear to be at a variable distance from the observer 50. When the screen 66 is moved inside the focal plane of infinity display 52 the apparent distance to the aircraft image 68 decreases, and a corresponding increase in the aircraft image size makes the scene very realistic. This realism manifests itself in the proper relative parallax between the aircraft image 68 and the terrain/sky image 64 at infinity. The slight tilting of the aircraft display screen 66 further heightens the realism, since when the aircraft image 68 is at its closest position, i.e., in "refueling position," and the aircraft image is correctly displayed, the length of the receiver aircraft image from nose to tail section is properly viewed by the observer 50 as a virtual image which also has the true apparent depth from nose to tail section. Thus, by means of the tilting of the aircraft display screen 66, when the aircraft image 68 is brought to its "refueling position" the nose of the aircraft (a B-52 in this example) might appear to the observer 50 to be 30 feet away while at the same time the tail section of the aircraft would be at an apparent distance of 157 feet. Although the tilt of the aircraft display screen 66 is fixed relative to the optical axis of the system, when the screen 66 recedes away from the infinity display 52 and the aircraft image 68 shrinks in apparent size the relation of apparent aircraft depth with respect to aircraft distance also diminishes as it should to maintain realism.

Finally, the third input to the system, the model 80 of the refueling boom is long enough to be suspended at a point outside the field of view of the display 52. The model length translates into its real world length when it is viewed as a virtual image through the optical system. The model 80 also has apparent depth from that portion of the model closest to the observer 50 to the more distant refueling tip of the boom, and this true apparent depth provides the variable relative parallax between the boom and the receiver aircraft with either relative motion between boom and aircraft, or with relative motion between observer, boom and aircraft, or all three. It is this true relative parallax which provides the accurate visual cues to which the trainee observer must respond. Because the refueling boom input is a three-dimensional physical model whose virtual image is made to appear real world size, it also provides the visual cue of stereopsis to the observer. The boom input also exhibits excellent resolution because it is a real physical model.

In a particular embodiment of the described in-flight refueling simulation apparatus the infinity display system 52 advantageously has an aperture of 30 inches by 15 inches and a focal length of 24 inches. The bi-refringent package 54 is tilted forward relative to the optical axis of the system at an angle of 14°, and the aircraft display screen 66 is tilted backward toward the observer by an angle of 5° relative to the normal to the optical axis of the apparatus.

In summary, the optical simulation apparatus of the present invention provides an observer with a composite view of three relatively movable inputs in such a manner that the virtual images of these inputs can give exactly the three-dimensional simulation of a real world situation, complete with true apparent distances and true relative parallax.

What is claimed is:

1. Optical simulation apparatus for training an observer in the manipulation of a controllable real-life element relative to at least one real-life image, said apparatus comprising:
    (a) optical means for forming an image at or near infinity for stereoscopic viewing by said observer;
    (b) a first display screen and means for generating a first display of a simulated real-life image on said first display screen;
    (c) a second display screen and means for generating a second dislay of another simulated real-life image on said second display screen;
    (d) means for combining images from said first and second display screens and for directing said images toward said optical means for forming an image viewable by said observer; and
    (e) a three-dimensional physical object positioned between at least one of said display screens and said optical means for forming an image, whereby said physical object is itself directly viewable by said observer with parallax and relative distance relative to said first and second displays, said physical object being a dimensionally smaller model of said controllable real-life element.

2. Optical apparatus according to claim 1 wherein said means for combining images is a beam splitting mirror.

3. Optical apparatus according to claim 1 further comprising means for moving said physical display object relative to at least one of said display screens.

4. Optical apparatus according to claim 1 further comprising means for moving at least one of said first and second display screens relative to said optical means for forming an image.

5. Optical apparatus according to claim 1 wherein at least one of said first and second display screens is inclined from the normal to said optical axis.

6. Optical apparatus according to claim 1 wherein the optical means for forming an image is inclined from the normal to said optical axis.

* * * * *